United States Patent
Korenblik

(10) Patent No.: US 8,801,398 B2
(45) Date of Patent: Aug. 12, 2014

(54) TURBOCOMPRESSOR ASSEMBLY WITH A COOLING SYSTEM

(75) Inventor: Gerard Korenblik, Diepenheim (NL)

(73) Assignee: Siemens Aktiengesellschaft, München (DE)

( * ) Notice: Subject to any disclaimer, the term of this patent is extended or adjusted under 35 U.S.C. 154(b) by 244 days.

(21) Appl. No.: 13/382,305

(22) PCT Filed: Jun. 22, 2010

(86) PCT No.: PCT/EP2010/058760
§ 371 (c)(1),
(2), (4) Date: Jan. 5, 2012

(87) PCT Pub. No.: WO2011/006736
PCT Pub. Date: Jan. 20, 2011

(65) Prior Publication Data
US 2012/0107105 A1    May 3, 2012

(30) Foreign Application Priority Data
Jul. 13, 2009  (EP) ..................................... 09009104

(51) Int. Cl.
F04B 39/02 (2006.01)
F04B 35/04 (2006.01)
H02K 5/16 (2006.01)

(52) U.S. Cl.
USPC ........ 417/368; 417/369; 417/372; 417/423.8; 310/90

(58) Field of Classification Search
USPC .............. 417/369, 366, 372, 228, 723.8, 368, 417/370, 371; 310/90
See application file for complete search history.

(56) References Cited

U.S. PATENT DOCUMENTS

| 5,129,795 | A | 7/1992 | Hyland |
| 6,246,138 | B1 * | 6/2001 | Nims ............................... 310/90 |
| 6,464,469 | B1 * | 10/2002 | Grob et al. .................... 417/251 |
| 7,923,871 | B2 | 4/2011 | Weiss |
| 2007/0018516 | A1 | 1/2007 | Pal et al. |
| 2007/0172363 | A1 * | 7/2007 | Laboube et al. ............... 417/370 |
| 2008/0245082 | A1 * | 10/2008 | Sishtla .............................. 62/84 |

FOREIGN PATENT DOCUMENTS

| CN | 1296551 A | 5/2001 |
| CN | 101410623 A | 4/2009 |

(Continued)

Primary Examiner — Bryan Lettman
Assistant Examiner — Timothy P Solak

(57) ABSTRACT

A turbocompressor assembly is provided, which is divided along a rotor axis into at least three sections. The three sections include a bearing section having an active magnetic bearing, a motor section including a motor having a stator arranged along the rotor axis, the stator enclosing a circumferential motor gap formed between the stator and the rotor, and a compressor section having a compressor for compressing a cooling fluid. A gas-tight housing encloses the rotor, the bearing section, the motor section and the compressor section. A cooling system is provided having an inlet for supplying the pressurized cooling fluid to the bearing section and the motor section through a fluid channel positioned between the bearing section and the motor section. The cooling system includes a throttling device positioned adjacent to the motor gap for limiting the flow of cooling fluid from the fluid channel to the motor gap.

11 Claims, 3 Drawing Sheets

(56) References Cited

FOREIGN PATENT DOCUMENTS

| | | |
|---|---|---|
| DE | 102005034341 A1 | 1/2007 |
| DE | 602004001156 T2 | 4/2007 |
| EP | 1074746 B1 | 5/2005 |
| EP | 1069313 B1 | 9/2005 |
| EP | 1482179 B1 | 12/2006 |
| EP | 1826887 A2 | 8/2007 |
| EP | 1392981 B1 | 7/2008 |
| EP | 1251624 B1 | 1/2009 |
| WO | WO 02099286 A1 | 12/2002 |

* cited by examiner

TURBOCOMPRESSOR ASSEMBLY WITH A COOLING SYSTEM

CROSS REFERENCE TO RELATED APPLICATIONS

This application is the US National Stage of International Application No. PCT/EP2010/058760, filed Jun. 22, 2010 and claims the benefit thereof. The International Application claims the benefits of European application No. 09009104.2 filed Jul. 13, 2009. All of the applications are incorporated by reference herein in their entirety.

FIELD OF INVENTION

The present invention relates to a turbocompressor assembly according to the preamble of the independent claim.

BACKGROUND OF INVENTION

A turbocompressor assembly is known which usually comprises a rotor, bearing sections including bearings and bearing gaps, a motor section having a motor with a stator and a motor gap and a cooling system for cooling the bearing section and the motor section or other related components of the assembly. Such cooling systems generally include at least one inlet valve for supplying a pressurized cooling fluid to the bearing section and the motor section through different fluid channels in each section.

Such a known turbocompressor assembly is known from U.S. Pat. No. 6,464,469. The turbocompressor disclosed in the document comprises a radial turbocompressor functioning as a cooling system, a rotor, an electric motor, and a bearing section comprising a plurality of electromagnetic radial bearings. The turbocompressor includes one inlet and outlet fluid channel for connecting the turbocompressor in a fluid-conducting manner. The turbocompressor further includes inlet valves for supplying the cooling fluid to the radial and axial bearings and then to the electric motor section. This embodiment has the disadvantage that it requires more recycling flows of the cooling fluid to obtain the desired cooling effect.

Generally, the flow of cooling fluid through the motor gap is determined by the required cooling flow through the bearing gaps. However, in such a turbocompressor assembly, the parameters such as pressure, temperature, etc at the cooling gaps in the bearing section may be different to the corresponding parameters of the motor gap. This increases the flow of the cooling fluid through the motor section more than required, thereby increasing the recycling flows. These higher recycling flows in turn lower the performance of the compressor of the turbocompressor assembly.

SUMMARY OF INVENTION

It is an object of the invention to improve the efficiency of the turbocompressor assembly by reducing the recycling flows.

This problem is solved by the features of the independent claim(s).

By placing a throttling means in the turbocompressor assembly to modulate the flow of cooling fluid from the bearing section to the motor gap allows to maintain a higher flow at the bearing section, thereby eliminating the need of increased fluid recycles through the compressor section. This in turn improves the efficiency of the turbocompressor assembly.

According to a preferred embodiment, the throttling means is positioned adjacent to the ingress for the cooling fluid flow to the motor gap. This limits the flow from the fluid channel to the motor gap which ensures increased flow to the bearing section.

According to another preferred embodiment, the turbocompressor assembly includes an additional inlet for supplying the pressurized cooling fluid to the motor gap through an additional fluid channel positioned between the bearing section and the motor section and a fluid connection between the fluid channel and the motor gap, wherein the throttling means is positioned such that it limits the flow through the fluid connection. This helps to achieve the desired flow required for cooling the motor section.

According to yet another preferred embodiment, the additional fluid channel is positioned adjacent to the motor section. This enables the cooling of the motor section in direct proportion to the cooling requirements as determined by the pressure conditions of the cooling fluid.

According to another preferred embodiment, cooling system further comprises a flow inlet for supplying the pressurized cooling fluid to a bearing gap in the bearing section in a direction opposite to the direction of supply of cooling fluid from the fluid inlet. This enables to supply a substantial amount of cooling fluid directly to the bearing section to ensure improved cooling of all the parts in the bearing section.

According to another preferred embodiment, the cooling fluid surrounding a thrust disk flow outwards through a passageway in the bearing section to the additional fluid channel, where the passageway is formed in a radially extending portion of the bearing section and opening to the additional fluid channel. This enables possible utilization of the diameter of the top bearing section to permit necessary cooling of the entire bearing arrangement.

According to yet another preferred embodiment, the compressor section is arranged adjacent to the motor section, wherein the compressor section receives the cooling fluid from the motor gap and supplies the compressed cooling fluid to the bearing section and the motor section through the at least one inlet. This enables a continuous fluid connection with the compressor for compressing the cooling fluid to a high pressure.

According to another preferred embodiment, the inlet valves regulate the flow of cooling fluid such that the required amount of cooling fluid is provided to both the bearing gap and the motor gap. This helps to ensure desired cooling of the bearings and the motor and to minimize the recycling flows of the cooling fluid through the compressor.

According to yet another preferred embodiment, the at least one inlet is disposed external to the gas-tight housing. This helps to easily access the valve for monitoring the valve operations for routine maintenance or other purposes.

According to yet another preferred embodiment, the throttling means is a labyrinth seal. This structural design makes it possible to keep the free space for the cooling fluid flow to a minimum.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
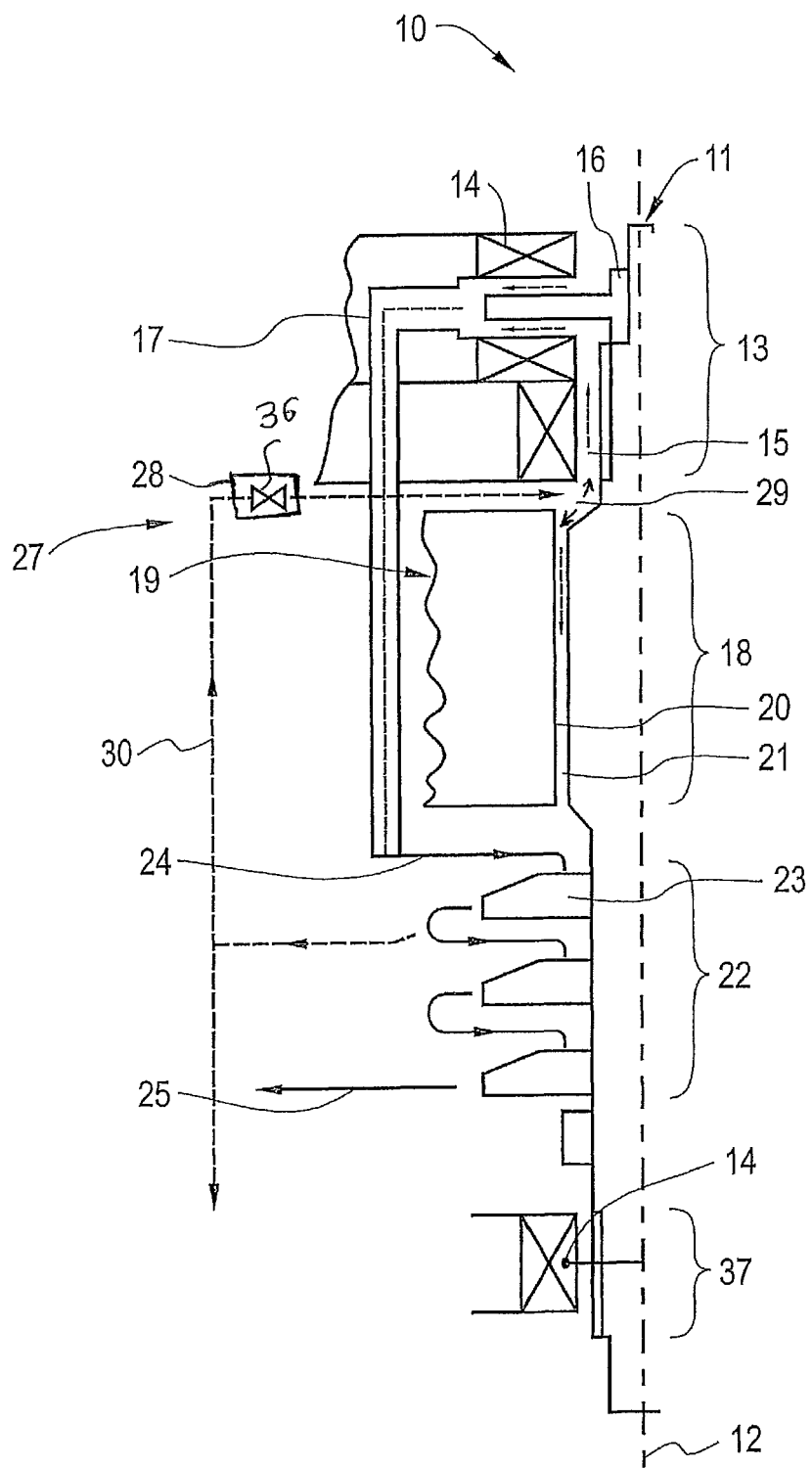
FIG. 1 illustrates a cross-sectional view of a prior art turbocompressor assembly, taken along its longitudinal section.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a turbocompressor assembly 10 of the prior art. The turbocompressor assembly 10 includes a rotor 11, a bearing section 13, a motor section 18, a compressor section 22 and a cooling system 27. The cooling system 27 comprises of a fluid inlet 28 comprising a valve 36 for supplying a pressurized cooling fluid 30 to the bearing section 13 and to the motor gap 21 through a fluid channel 29 positioned between the bearing section 13 and the motor section 18. Here the bearing section 13 comprises at least one bearing 14 for supporting the rotor 11 wherein the at least one bearing 14 is an active magnetic bearing. The cooling system 27 is used to supply a cooling fluid 30 to cool the bearing 14 and the thrust disk 16 of the bearing section 13 and the motor 19 of the motor section 18. The fluid 30 carries away the heat from the bearing section 13 and directs the fluid through a passageway 17 formed in a radially extending portion of the bearing section 13 and opening to the fluid channel 29. The fluid 30 from the motor gap 21 is also directed to the compressor section 22, where the motor gap 21 is terminated.

The cooling system 27 is generally designed to tailor cooling fluid 30 flows to different sections of the assembly 10 to meet the different cooling requirements. The bearing section 13 requires more cooling fluid 30 as compared to the motor section 18. The bearing section 13 has a high pressure as compared to the motor section 18. Consequently, the cooling flow to the bearing section 13 may be, for example, only 10 percent of the total cooling flow supplied by the cooling system 27 whereas the cooling fluid 30 flow to the motor section 18 may be 90 percent. The pressure of the cooling fluid 30 flow to the bearing section 13 and to the motor section 18 may also be significantly different. This demand for higher recycling flows to facilitate proper cooling of the bearings 14.

Figure 2:
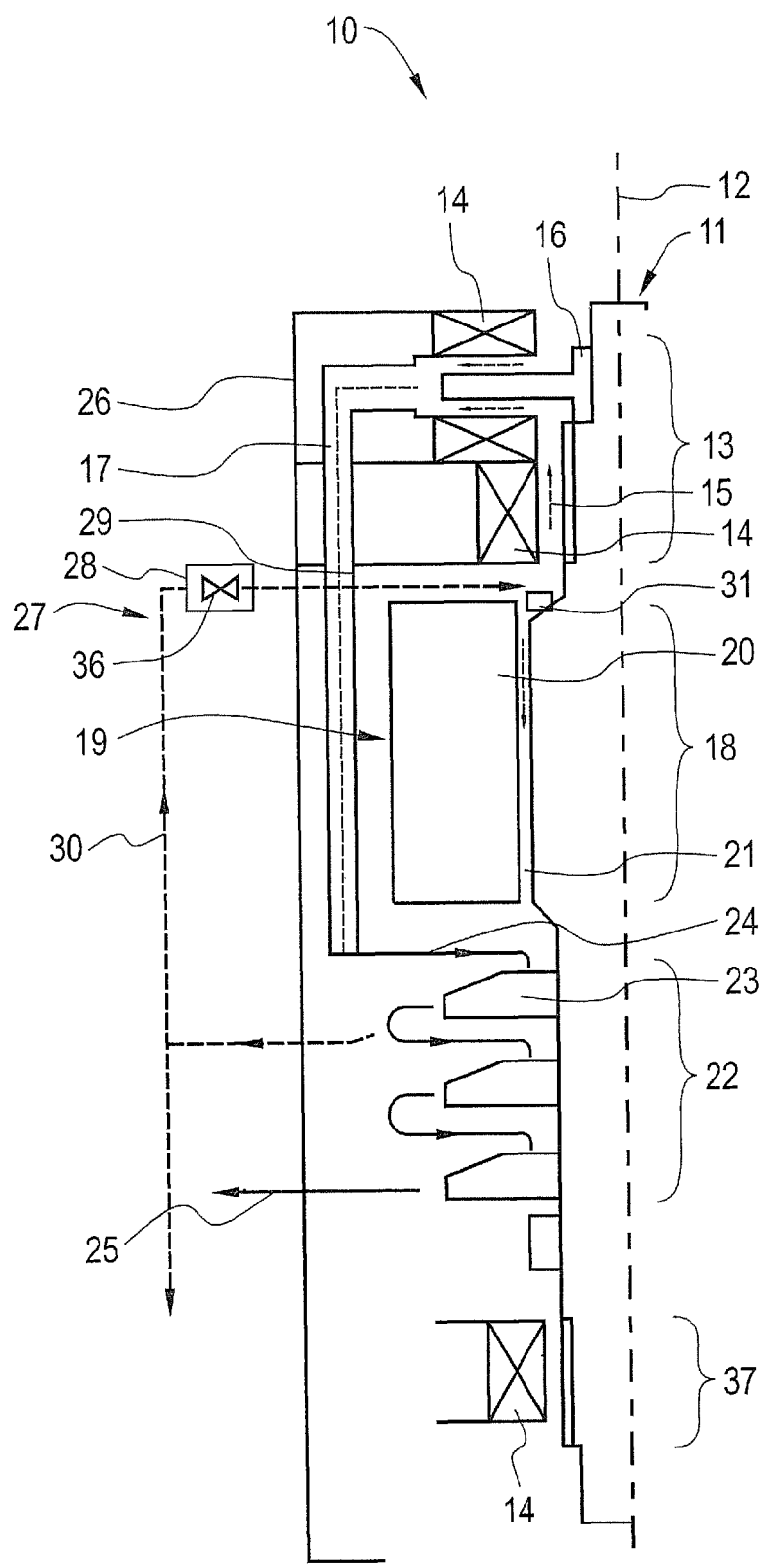
FIG. 2 illustrates a cross-sectional view of a turbocompressor assembly having a cooling system according to an embodiment herein.

FIG. 2 illustrates a turbocompressor assembly 10 including a cooling system 27 according to the invention. As illustrated in FIG. 2, the turbocompressor assembly 10 includes a rotor 11 having an axis 12 of rotation, a bearing section 13, an additional bearing section 37, a motor section 18, a compressor section 22 and a cooling system 27.

The bearing sections 13, 37 comprises at least one bearing 14 wherein the at least one bearing 14 is an active magnetic bearing for supporting the rotor 11. The bearing section 13 also includes a thrust disk 16 for supporting the rotor 11. The motor section 18 includes a motor 19 having a stator 20, where the motor 19 is preferably a small, high speed, brushless electric motor capable of driving the rotor 11. The stator 20 encloses a circumferential motor gap 21 which is foamed between the stator 20 and the rotor 11. The compressor section 22 includes a compressor 23 for compression of the cooling fluid 30. The compressor section 22 and the motor section 18 are arranged along the single common rotor shaft along the axis 12 of the rotor 11. In an embodiment, the rotor 11, the bearing section 13, the motor section 18, and the compressor section 22 are enclosed in a single gas-tight housing 26.

The turbocompressor assembly 10 further includes a cooling system 27 to provide a cooling fluid 30 for cooling the bearing section 13 and the motor section 18. The cooling system 27 comprising a fluid inlet 28 for supplying the pressurized cooling fluid 30 to the bearing 15 and to the motor gap 21 through a fluid channel 29 positioned between the bearing section 13 and the motor section 18.

In the embodiment herein, the cooling system 27 further comprises a throttling means 31 positioned adjacent to the motor gap 21 in the fluid channel 29 between the bearing section 13 and the motor section 18. This limits the flow of cooling fluid 30 from the inlet 28 to the motor gap 21, which in turn increases the flow to the bearing section 13 to cool the bearings 14. Preferably, the throttling means 31 is placed at the ingress for the cooling fluid 30 flow to the motor gap 21.

The throttling means 31 positioned between the fluid channel 29 and the motor gap 21 limits the outward flow of the cooling fluid 30 from the bearing section 13 to the motor section 18. This reduces the pressure of the cooling fluid 30 in the motor gap 21 thereby reducing the higher recycling flows through the compressor section 22. The throttling means 31 can be a labyrinth seal or any other suitable means. The throttling means 31 helps to throttle back the cooling fluid 30 pressure to the target pressure required for cooling the at least one bearing 14 in the bearing section 13.

In the embodiment of FIG. 2, the compressor section 22 is arranged on the region adjacent to the motor section 18 where the motor gap 21 is terminated. This enables the compressor section 22 to be in continuous connection with the fluid 30 from the motor gap 21. The compressor section 22 comprises of at least one inlet 24 and an outlet 25. The compressor inlet 24 guides the fluid 30 from the motor gap 21 to the compressor section 22 where the compressor 23 compresses the cooling fluid 20 to a high pressure. The compressed cooling fluid 30 extracted through the compressor outlet 25 is then circulated to cool the hot parts of the turbocompressor assembly 10. The pressurized cooling fluid 30 is provided to the bearing 14 and to the motor section 18 through the fluid inlet 28. Here the fluid inlet 28 includes a valve 36 which is operable in response to the pressure of the cooling fluid 30 for selectively varying the amount of pressurized cooling fluid 30 to the bearing section 13 and the motor section 18.

Figure 3:
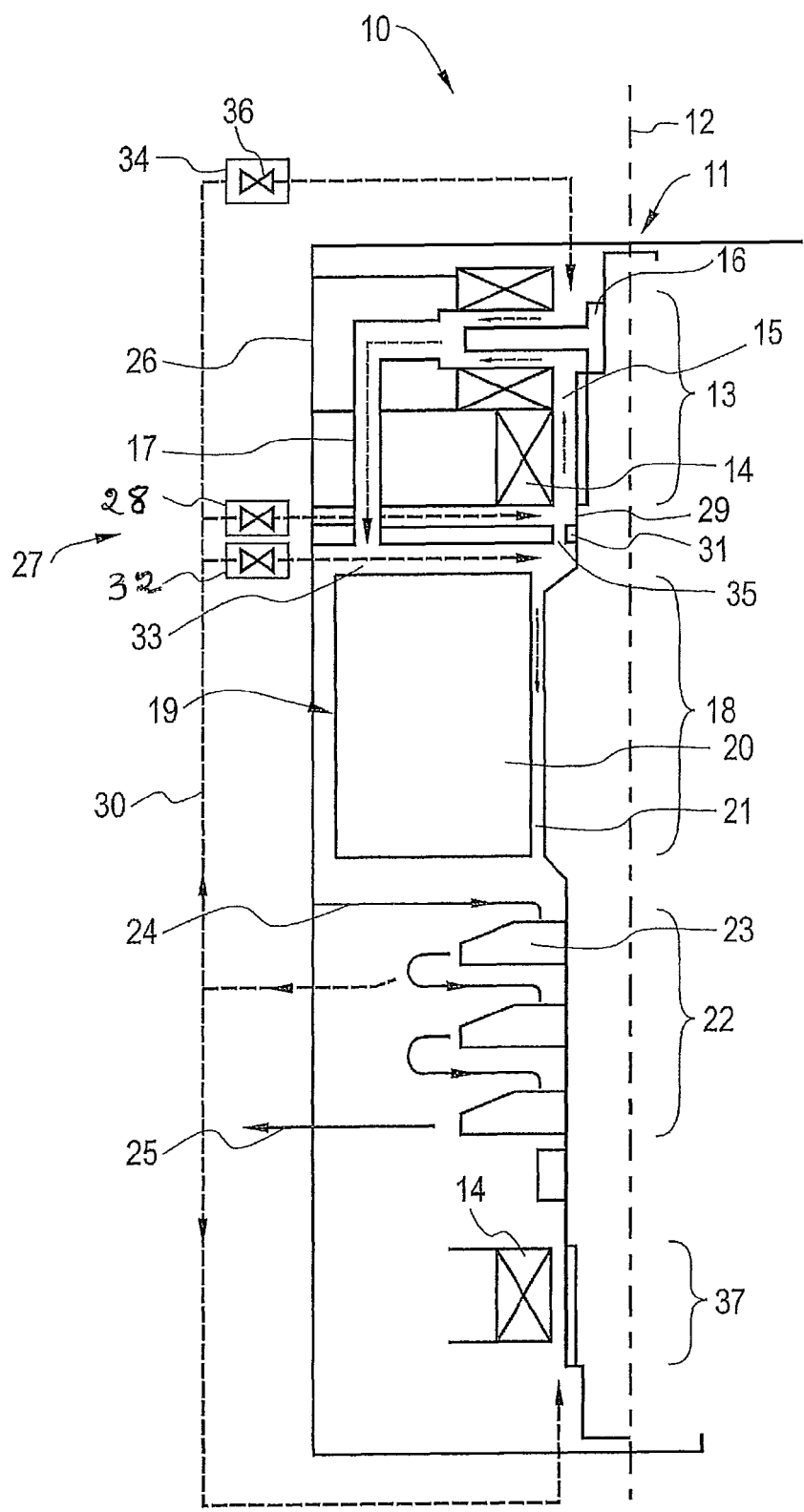
FIG. 3 illustrates a cross sectional view of another embodiment of the turbocompressor assembly according to the invention.

FIG. 3 illustrates a cross-sectional view of another embodiment of the turbocompressor assembly 10 according to the invention. This embodiment differs from the embodiment illustrated in FIG. 2 in that cooling system 27 according to FIG. 3 includes an additional inlet 32 for supplying the pressurized cooling fluid 30 to the motor gap 21 through an additional fluid channel 33 positioned between the bearing section 13 and the motor section 18 and a fluid connection 35 between the fluid channel 29 and the motor gap 21. In this embodiment, the throttling means 31 is positioned such that it limits the flow through the fluid connection 35.

The turbocompressor assembly 10 further includes a flow inlet 34 as a means for supplying the pressurized cooling fluid 30 to bearings 14 and the thrust disk 16 in the bearing section 13. The turbocompressor assembly 10 includes a passageway 17 for directing the cooling fluid 30 from the bearing gap 15 surrounding the thrust disk 16 in the bearing section 13 to the fluid channel 29. Here, the passageway 17 is formed in a radially extending portion of the bearing section 13 and opening to the fluid channel 29 between the bearing section 13 and the motor section 18. The cooling fluid 30 flow path for the turbocompressor assembly 10 includes the inlet 28 and the additional inlet 32 positioned in a mutually parallel relationship to collectively provide modulation of the cooling fluid 30 flow.

The fluid channel 29 is positioned closer to bearing section 13 and the additional fluid channel 33 is disposed closer to the motor section 18 to ensure improved cooling of these sections. The cooling fluid 30 supplied through the inlet 28 to the bearing section 13 cools the bearing 14 and the thrust disk 17 from one side whereas the cooling fluid 30 supplied to the bearing 15 through the flow inlet 34 cools the thrust disk 15 and bearing 14 from another side.

The compressed cooling fluid 30 extracted through the compressor outlet 25 is circulated to cool the hot parts of the turbocompressor assembly 10. Some portion of the cooling fluid 30 extracted from the compressor section 22 is passed on to the fluid channel 29 in the bearing section 13 between the bearing section 13 and the motor section 18. Other portion of the cooling fluid 30 is passed on to the additional fluid channel 33 between the motor section 18 and the bearing section 14 to cool the motor 19, stator 20 and other related parts of the motor section 18. Further, a portion of the cooling fluid 30 is passed on to the bearing section 13 through the flow inlet 34 to ensure improved cooling of the bearing section 13.

The cooling fluid 30 supplied to the fluid channel 29 is circulated through the bearing section 13 to carry away the heat from the bearings 14 and the warmed up fluid is then directed through the passageway 17 to the additional fluid channel 33 in the motor section 18. The additional inlet 32 supplying the pressurized cooling fluid 30 to the motor section 18 functions as a control means for regulating the flow of cooling fluid 20 through additional fluid channel 33 between the motor section 18 and the bearing section 13. This helps to supply more cooling fluid 30 to the bearing section 13 as compared to the motor section 18, as the bearing section 13 requires more cooling because of its more complex structure. The flow of cooling fluid 30 is regulated such that a pressure difference is reduced between the bearing section 13 and the motor section 18. This helps to avoid the hydrodynamic instability within the turbocompressor assembly 10 due to the imbalance flow to different sections.

The throttling means 31 positioned between the fluid channel 29 and the motor gap 21 limits the outward flow of the cooling fluid 30 from the bearing section 13 to the motor section 18. This reduces the pressure of the cooling fluid 30 in the motor gap 21 thereby reducing the higher recycling flows through the compressor section 22.

An improved control of cooling fluid 30 flow can be achieved by regulating the at least one valve 36 associated with at least one inlet 28, 32 and 34 of the assembly 10. The inlet valve 36 to vary the ratio of the cooling fluid 30 flow may be structurally independent of the turbocompressor assembly 10 and can be controlled manually or automatically depending upon some characteristics, such as temperature, pressure etc. As the inlets 28, 32 and 34 can be regulated for fluid control, the inlet 28, 32 and 34 failure does not appreciably reduce the overall cooling function. Concurrently, the turbocompressor 10 efficiency increases due to less cooling flow circulation.

The inlets can be used to modulate the cooling fluid flow in order to accommodate the cooling fluid flow, economizing when possible in order to increase the efficiency of the engine. For example, this founds extensive application in cases where a substantial amount of cooling fluid is needed for the cooling process during high temperature operating conditions or during some other periods of operation, only smaller amounts of cooling fluid is required and some parts does not require cooling fluid, etc.

The term cooling fluid as used in this application is intended to cover any gas, such as air or gases like hydrogen, nitrogen, helium etc which may be used for cooling.

The embodiment herein is applicable to high pressure systems, as systems of these types produce very high temperatures which require cooling. The valves can be made automatically responsive to operating conditions if it is desired, such as to operate a valve in response to temperature changes in the compressor discharge by means of the pressure of a confined fluid subjected to the discharge temperature or the like. The valves can be replaced with fixed orifices to increase robustness, for instance, in applications like subsea compression systems where maintenance is not easy to execute in case of valve failures.

The invention claimed is:

1. A turbocompressor assembly, the turbocompressor assembly being divided along an axis of a rotor into at least three sections, the at least three sections comprising:
   a bearing section having at least one active magnetic bearing to support the rotor,
   a motor section comprising a motor having a stator arranged along the axis of the rotor, wherein the stator encloses a circumferential motor gap which is formed between the stator and the rotor, and
   a compressor section having a compressor for compressing a cooling fluid;
   wherein the turbocompressor assembly further comprises:
   a common gas-tight housing enclosing the rotor, the bearing section, the motor section and the compressor section; and
   a cooling system having an inlet for supplying the pressurized cooling fluid to the bearing section and the motor section through a fluid channel positioned between the bearing section and the motor section, wherein the cooling system further comprises a throttling device positioned adjacent to the motor gap for limiting the flow of cooling fluid from the fluid channel to the motor gap,
   wherein the compressor section is arranged adjacent to the motor section, wherein the compressor section receives the cooling fluid from the motor gap and supplies a compressed cooling fluid to the bearing section and the motor section through the inlet.

2. The turbocompressor assembly according to claim 1, wherein the inlet includes a valve which is operable in response to the pressure of the cooling fluid for selectively varying the amount of pressurized cooling fluid to the bearing section and the motor section.

3. The turbocompressor assembly according to claim 1, wherein the inlet is disposed external to the gas-tight housing.

4. The turbocompressor assembly according to claim 1, wherein the turbocompressor assembly includes an additional bearing section comprising at least one active magnetic bearing.

5. A turbocompressor assembly, the turbocompressor assembly being divided along an axis of a rotor into at least three sections, the at least three sections comprising:
   a bearing section having at least one active magnetic bearing to support the rotor,
   a motor section comprising a motor having a stator arranged along the axis of the rotor, wherein the stator encloses a circumferential motor gap which is formed between the stator and the rotor, and
   a compressor section having a compressor for compressing a cooling fluid;
   wherein the turbocompressor assembly further comprises:
   a common gas-tight housing enclosing the rotor, the bearing section, the motor section and the compressor section; and
   a cooling system having an inlet for supplying the pressurized cooling fluid to the bearing section and the motor section through a fluid channel positioned between the bearing section and the motor section, wherein the cooling system further comprises a throttling device positioned adjacent to the motor gap for limiting the flow of cooling fluid from the fluid channel to the motor gap,
wherein the cooling system further comprises a flow inlet for supplying the pressurized cooling fluid to a bearing gap in the bearing section in a direction opposite to the direction of supply of cooling fluid from the fluid inlet.

6. The turbocompressor assembly according to claim 5, wherein the passageway is formed in a radially extending portion of the bearing section and opening to the additional fluid channel.

7. A turbocompressor assembly, the turbocompressor assembly being divided along an axis of a rotor into at least three sections, the at least three sections comprising:
a bearing section having at least one active magnetic bearing to support the rotor,
a motor section comprising a motor having a stator arranged along the axis of the rotor, wherein the stator encloses a circumferential motor gap which is formed between the stator and the rotor, and
a compressor section having a compressor for compressing a cooling fluid;
wherein the turbocompressor assembly further comprises:
a common gas-tight housing enclosing the rotor, the bearing section, the motor section and the compressor section; and
a cooling system having an inlet for supplying the pressurized cooling fluid to the bearing section and the motor section through a fluid channel positioned between the bearing section and the motor section, wherein the cooling system further comprises a throttling device positioned adjacent to the motor gap for limiting the flow of cooling fluid from the fluid channel to the motor gap,
wherein the cooling system further comprises:
an additional inlet for supplying the pressurized cooling fluid to the motor gap through an additional fluid channel positioned between the bearing section and the motor section; and
a fluid connection between the fluid channel and the motor gap; wherein the throttling device is positioned such that it limits the flow through the fluid connection.

8. The turbocompressor assembly according to claim 7, wherein the throttling device is positioned adjacent to an ingress for the cooling fluid flow to the motor gap.

9. The turbocompressor assembly according to claim 7, wherein the additional fluid channel is positioned adjacent to the motor section.

10. The turbocompressor assembly according to claim 7, wherein the fluid channel and the additional fluid channel are arranged as parallel pipes positioned between the bearing section and the motor section.

11. The turbocompressor assembly according to claim 7, wherein the cooling fluid surrounding a thrust disk flows outwards through a passageway in the bearing section to the additional fluid channel.

\* \* \* \* \*